United States Patent [19]

Schweikert et al.

[11] Patent Number: 4,920,457
[45] Date of Patent: Apr. 24, 1990

[54] ALUMINUM ELECTROLYTE CAPACITOR AND METHOD FOR THE MANUFACTURE THEREOF

[75] Inventors: Wilhelm Schweikert, Heidenheim-Mergelst; Norbert Will, Heidenheim; Wilhelm Lauer, Giengen-Huerben, all of Fed. Rep. of Germany

[73] Assignee: Siemens Aktiengesellschaft, Berlin and Munich, Fed. Rep. of Germany

[21] Appl. No.: 278,349

[22] Filed: Dec. 1, 1988

[30] Foreign Application Priority Data

Jan. 12, 1988 [DE] Fed. Rep. of Germany ....... 3800641
Feb. 8, 1988 [DE] Fed. Rep. of Germany ....... 3803768
Jun. 10, 1988 [DE] Fed. Rep. of Germany ....... 3819850

[51] Int. Cl.$^5$ .............................................. H01G 9/00
[52] U.S. Cl. .................................... 361/530; 29/25.03
[58] Field of Search ...................... 252/62.2; 29/570.1; 361/500–540, 272, 306 C, 321 C

[56] References Cited

U.S. PATENT DOCUMENTS

| | | | |
|---|---|---|---|
| 2,107,780 | 2/1938 | Danziger et al. | 29/570.1 |
| 2,190,286 | 2/1940 | Gaut et al. | 252/62.2 X |
| 3,319,133 | 5/1967 | Sparrow et al. | 361/539 |
| 4,208,316 | 6/1980 | Nauroth et al. | 106/490 X |
| 4,275,048 | 6/1981 | Stein et al. | 423/328 X |
| 4,719,156 | 1/1988 | Niksa et al. | 429/72 X |
| 4,760,494 | 7/1988 | Crum | 361/517 X |

FOREIGN PATENT DOCUMENTS

| | | | |
|---|---|---|---|
| 870587 | 3/1953 | Fed. Rep. of Germany . | |
| 1489839 | 10/1969 | Fed. Rep. of Germany . | |
| 2950246 | 6/1981 | Fed. Rep. of Germany . | |
| 3004728 | 8/1981 | Fed. Rep. of Germany . | |
| 118761 | 10/1978 | Japan | 29/570.1 |
| 383122 | 11/1932 | United Kingdom | 361/306 |
| 1220555 | 1/1971 | United Kingdom | 29/570.1 |
| 2125219 | 2/1984 | United Kingdom | 361/272 |

Primary Examiner—Donald A. Griffin
Attorney, Agent, or Firm—Hill, Van Santen, Steadman & Simpson

[57] ABSTRACT

An aluminum electrolyte capacitor is provided composed of two aluminum foils between which spacers saturated with the operating electrolyte are arranged. Terminal elements are riveted and/or welded to the foils. The anode foil provided with the dielectrically acting oxide layer may potentially be produced from a larger, formed foil web. The non-formed cut edges of the aluminum foil as well as the terminal elements are covered with a fine-grained, electrolyte-compatible material. As a result thereof, the maximum operating voltage $U_{max}$ of traditional operating electrolytes is boosted.

19 Claims, 1 Drawing Sheet

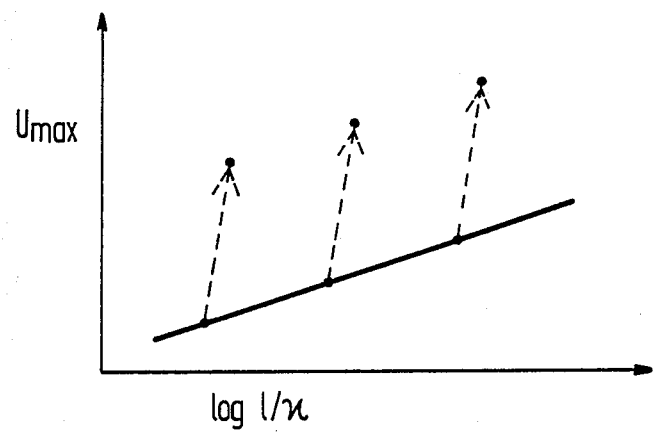

ALUMINUM ELECTROLYTE CAPACITOR AND METHOD FOR THE MANUFACTURE THEREOF

BACKGROUND OF THE INVENTION

The present invention is directed to an aluminum electrolyte capacitor composed of wound layers of two aluminum foils, the foil serving as an anode is provided with an oxide layer acting as dielectric, wherein the anode foil can be potentially produced by parting from a larger shaped foil web, spacers saturated with an operating electrolyte are arranged between the two aluminum foils, and the aluminum foils are contacted with riveted and/or welded power supply terminal strips. The invention is also directed to a method for the manufacture of same.

The electric strength of aluminum electrolyte capacitors is essentially limited by the dielectric oxide layer, the electrolyte, and the spacers (paper, plastic foils or the like). The electrolyte especially is responsible for a critical limitation of the voltage strength, so that increased gas development and arc-overs then arise above the voltage conditioned by the respective operating electrolyte.

This problem can be avoided in that all formatting parts are designed for the high peak voltage. But, this solution results in high costs and, has the disadvantage that one is forced to utilize operating electrolyte having a high sparking voltage that, however, exhibits a low conductivity. Accordingly, the electrical loss properties of the capacitor are significantly deteriorated.

With respect to the peak electric strength, the weak points are the points of the anode at which the anode contacts the electrolyte without a separator layer that boosts the drop resistance. The weak points also include those surfaces that are not provided with a pre-forming layer (for example, cut anode edges, terminal elements).

German Patent No. DE-C 870 587 discloses an electrolyte capacitor wherein the cut edge of the preformed foil is provided with a non-conductive coating that is indifferent with respect to the electrolyte. The non-conductive coating is preferably composed of lacquer. A difficulty in this design exists in that only the cut edges are covered, but passages lying in the interior of the winding cannot be inactivated or can only be inactivated with an extremely great outlay.

German Patent No. 29 50 246 A1 further discloses that plastic laminates are arranged above the terminal strip. Large gaps in the capacitor winding are created due to this type of covering. These large gaps lead to a great scattering of the electrical values. The cut edges cannot be inactivated with this method.

German Patent No. 30 04 728 A1 discloses that the power supply terminal strips be provided with a gamma-$Al_2O_3$ layer based on a temperature treatment. However, faults at the anode foil cannot be eliminated with this method because the dielectric layer produced by anodic oxidation would be damaged by a temperature treatment.

German Patent No. 14 89 839 A discloses that chemical substances such as barium oxide, strontium oxide, or calcium oxide are added to an electrolyte capacitor in order to weaken or prevent the injurious consequences of moisture in combination with the gases. An inactivation of the edges and voids is not therewith achieved.

SUMMARY OF THE INVENTION

The present invention provides an aluminum electrolyte capacitor wherein an inactivation of the above-mentioned weak points is achieved with simple means in a cost-beneficial way. A method of manufacturing same is also provided.

This object is inventively achieved in that the terminal elements and, potentially, the cut edges of the aluminum foils arranged at the face ends of the winding are covered with a fine-grained, electrolyte-compatible material.

To this end, the present invention provides an aluminum electrolyte capacitor composed of wound layers of two aluminum foils, the foil serving as an anode is provided with an oxide layer acting as dielectric. The anode foil can be potentially produced by parting from a larger, formed foil web. Spacers saturated with an operating electrolyte are arranged between the two aluminum foils and the aluminum foils are contacted with riveted and/or welded power supply terminal strips. The terminal elements and, potentially, the cut edges of the aluminum foil arranged at the face sides of the winding are covered with a fine-grained, electrolyte-compatible material.

In an embodiment, the fine-grained material is composed of at least one compound chosen from the group consisting of silicic acid, diatomaceous earth, hydrargillite ($Al(OH)_3$), and cellulose fibers.

In an embodiment, the fine-grained material is composed of high-purity, highly dispersed and finely dispersed silicic acid having a specific surface of approximately 50 to about 300 $m^2/g$ and a mean primary particle size of approximately 10 to about 40 nm.

The method for manufacturing the aluminum electrolyte capacitor of the present invention includes the step of applying the fine-grained material either dry or slurried in the corresponding operating electrolyte.

In an embodiment of the method, the fine-grained material is applied on the capacitor winding impregnated with the operating electrolyte.

In an embodiment of the method, the electrolyte-compatible, fine-grained material is added to the operating electrolyte before the impregnation of the capacitor and the capacitor is impregnated with this mixture.

In an embodiment of the method, the fine-grained material is additionally selectively applied onto the capacitor winding.

The advantages of the present invention are comprised therein that the sparking voltage of the operating electrolyte or, respectively, its conductivity is increased or, respectively, reduced only at the weak points. The effective cross-section of the electrolyte, namely, is reduced by the fine-grained material. This is equivalent to a lower conductivity and higher sparking voltage connected therewith. A more highly conductive operating electrolyte can thus be employed without having the worry of disadvantageous consequences.

The electrolyte-saturated, fine-grained material acts, as a drop resistor or, respectively, as a means for reducing the charge carrier density at the weak location.

When there is a risk that the protective coat cannot reach all required surfaces, particularly in the inside of the winding, for example, due to the formation of air bubbles, it is especially advantageous when the electrolyte-compatible, fine-grained material is added to the operating electrolyte before the impregnation of the capacitor and when the capacitor is impregnated with this mixture, whereby fine-grained material may be potentially additionally selectively applied onto the capacitor winding. The fine-grained material (silicic acid, paper fibers, . . . ) added to the operating electrolyte can be mainly filtered out at the spacers (electrolyte capacitor paper or other separators that are wound in), so that the fine-grained material remains stuck at the weak locations (cut edges, terminal strips) of the electrolyte capacitor and forms an electrolyte mixture there, that has a higher electric strength.

Additional features and advantages of the present invention will be apparent from the detailed description of the presently preferred embodiments and from the drawing.

BRIEF DESCRIPTION OF THE DRAWING

The FIGURE illustrates, as a solid line, the linear dependency of the maximum operating voltage $U_{max}$ on the logarithm of the reciprocal conductivity log 1/k of different traditional operating electrolytes.

DETAILED DESCRIPTION OF THE PRESENTLY PREFERRED EMBODIMENTS

The present invention provides an improved aluminum electrolyte capacitor and method of making same. Pursuant to the present invention, the terminal elements and, potentially, the cut edges of the aluminum foils arranged at the face ends of the winding, are covered with a fine-grained electrolyte-compatible material.

Referring now to the Figure, the linear dependency of the maximum operating voltage $U_{max}$ on the logarithm of the reciprocal conductivity log 1/k of different traditional operating electrolytes is shown as a solid line. The value to be anticipated for the maximum operating voltage $U_{max}$ can therefore be estimated for every electrolyte having a known conductivity.

When a high-purity, highly dispersed and finely dispersed silicic acid having a specific surface of approximately 50 to about 300 m²/g and having a mean primary particle size of approximately 10 to about 40 nm is added to the operating electrolyte, the sparking voltage and the maximum operating voltage $U_{max}$ of the operating electrolyte are boosted considerably higher than is to be anticipated due to the slight loss of conductivity. This is shown in the Figure by the broken lines.

This effect is attributed thereto that a large part of the silicic acid deposits at the cut foil edges and at the terminal elements during impregnation. This locally increases the electric strength at the foil edges and the terminal elements. The silicic acid does not chemically modify the operating electrolyte and, as a consequence of the fine dispersion, is likewise not filtered off at the end faces during impregnation but, rather, proceeds into the interior of the capacitor winding. The silicic acid is present as amorphous silicon dioxide that is produced by oxyhydrogen gas hydrolysis and, for example, is commercially available under the tradename "Aerosil".

By utilizing suitable dispersion agents, the silicic acid can be so finely dispersed that the electrolyte penetrates into the winding in a nearly unfiltered form and is also impregnatable with a higher proportion of silicic acid. By utilizing silicic acid having a lower specific surface, for example in the region of the lower limit values, i.e., at approximately 50 m²/g, the dispersing capability can be further enhanced because such a silicic acid has less of a thickening effect.

The operating electrolyte having highly dispersed, amorphous silicon dioxide is distinguished not only by a higher sparking voltage but also by a lower residual current of the electrolyte capacitors impregnated therewith in some instances.

Due to the thickening effect of the highly dispersed silicon dioxide, the viscosity of the operating electrolyte is greatly increased. This is particularly true at higher operating temperatures. The effects of gravity and of accelerating forces on the stability of the system of the operating electrolyte and spacers (separators) is thus reduced. The viscosity of the operating electrolyte is therefore less dependent on the temperature than that of traditional electrolyte.

An operating electrolyte composed of 9 0 through 11.0 mol of ethyleneglycol, 2.0 through 5.0 mol of boric acid, 0.1 through 0.5 of adipic acid, 0.9 through 1.5 mol of ammonia, 0.05 through 0.15 mol of phosphoric acid, and 4.0 through 6.0 mol of water and that is disclosed in German Patent No. 26 41 931, and 4 weight percent of amorphous silicon dioxide having a specific surface of 200 ±25 m²/g (measured according to DIN 66131) were mixed. The mean size of the primary particles was 12 nm. The maximum operating voltage of the operating electrolyte was thereby boosted from 470 V to 510 V. The decrease in conductivity, by contrast, was only 10%, from which an increase of the maximum voltage $U_{max}$ of only 4 V would have been anticipated based on a classic estimate according to the FIGURE.

Given the same electrolyte system, amorphous silicon dioxide having a mean surface of 50 ±15 m²/g and a mean size of the primary particles of 40 nm was further added thereto. Aluminum electrolyte capacitors having the nominal values 6.8 uF/450 V were impregnated therewith and the residual currents were identified after five minutes of measuring time. Compared to a residual current of 4.8 uA for the operating electrolyte without additive, a value of residual current of 1.4 uA was achieved for an operating electrolyte having the disclosed additive of silicic acid.

Other fine-grained materials can be utilized in the present invention. Suitable fine-grained materials include diatomaceous earth, hydrargillite (Al(OH)₃), as well as, cellulose fibers and all other fine-grained materials that are obtainable in pure and electrolyte-compatible form.

It is also possible to provide the winding impregnated with the operating electrolyte with the fine-grained material, thereby, the protective coat penetrates up to the face edges of the winding and penetrates into the winding along the gap-forming elements when applied to the face sides of the winding.

A further effect of the treatment with a gel-like application composed of fine-grained material slurried with operating electrolyte onto the terminal strips (specifically in the region of the exit thereof from the winding) is that there is a noticeable reduction of the risk of corrosion at these locations. The corrosion that arises due to some electrolytes and high operating voltage in the phase transition, is largely prevented or significantly delayed, on a time basis, due to the application of the fine-grained material, or, respectively, of the electrolyte thickened gel-like material.

Accordingly, in a simple manner, the present invention allows an improvement of the electric strength of aluminum electrolyte capacitors given a simultaneous improvement of the electrical values and a prevention of corrosion.

A comparison between traditional electrolyte capacitors and electrolyte capacitors treated pursuant to the present invention is set forth below in the table.

|  | Maximum Peak Voltage (t > 1 h) | Gas Arising In the Reforming To 605 V | Time Required To Achieve 600 V After Storage (1 mA Constant, C = 10 uF |
| --- | --- | --- | --- |
| Traditional Electrolyte Capacitor | 600 V | 1.8 ... 6.0 cm$^3$ | 10 ... 25 sec (Partly not achieved) |
| Treated Electrolyte Capacitor | 640 V | 0.8 ... 1.1 cm$^3$ | 10 ... 13 sec |

As can be seen from the table the subject matter of the present invention exhibits higher peak voltage values given a significantly diminished formation of gas and also has the required electric strength even after voltageless storing.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An aluminum electrolyte capacitor that is composed of wound layers of two aluminum foils, whereof the foil serving as anode is provided with an oxide layer acting as dielectric, whereby this anode foil is produced by cutting from a larger, formed foil web, whereby spacers saturated with an operating electrolyte are arranged between the two aluminum foils and whereby the aluminum foils are contacted with riveted and/or welded power supply terminal strips, the terminal elements and cut edges of the aluminum foil arranged at the face sides of the winding are covered with a fine-grained, electrolyte-compatible material to reduce the effective cross-section of the electrolyte by the fine-grained material to increase the sparking voltage of the operating electrolyte and thus to achieve an inactivation of weak points.

2. The aluminum electrolyte capacitor of claim 1 wherein the fine-grained material includes at least one compound chosen from the group consisting of silicic acid, diatomaceous earth, hydrargillite (Al)OH)$_3$), and cellulose fibers.

3. The aluminum electrolyte capacitor of claim 2 wherein the fine-grained material is composed of high-purity, highly dispersed and finely dispersed silicic acid having a specific surface of approximately 50 to about 300 m$^2$/g and a mean primary particle size of approximately 10 to about 40 nm.

4. A method for manufacturing an aluminum electrolyte capacitor composed of two aluminum foils wherein the foil serving as anode is provided with an oxide layer acting as dielectric, whereby this anode foil is produced by cutting from a larger, formed foil web, whereby spacers saturated with an operating electrolyte are arranged between the two aluminum foils and whereby the aluminum foils are contacted with power supply terminal strips, wherein the terminal elements and cut edges of the aluminum foil arranged at the face sides of the winding are covered with a fine-grained, electrolyte-compatible material, the method including the step of applying the fine-grained material in the electrolyte to reduce the effective cross-section of the electrolyte by the fine-grained material to increase the sparking voltage of the operating electrolyte and thus to achieve an indication of weak points.

5. The method of claim 4 wherein the fine-grained material is applied in the dry state.

6. The method of claim 5 wherein the fine-grained material is applied on the capacitor winding impregnated with the operating electrolyte.

7. The method of claim 5 wherein the electrolyte-compatible, fine grained material is added to the operating electrolyte before the impregnation of the capacitor and the capacitor is impregnated with this mixture.

8. The method of claim 5 wherein the fine-grained material is additionally selectively applied onto the capacitor winding.

9. The method of claim 4 wherein the fine-grained material is applied in a wet state.

10. The method of claim 9 wherein the fine-grained material is applied on the capacitor winding impregnated with the operating electrolyte.

11. The method of claim 9 wherein the electrolyte-compatible, fine-grained material is added to the operating electrolyte before the impregnation of the capacitor and the capacitor is impregnated with this mixture.

12. The method of claim 9 wherein the fine-grained material is additionally selectively applied onto the capacitor winding.

13. The method of claim 4 wherein the fine-grained material is applied on the capacitor winding impregnated with the operating electrolyte.

14. The method of claim 4 wherein the electrolyte-compatible, fine-grained material is added to the operating electrolyte before the impregnation of the capacitor and the capacitor is impregnated with this mixture.

15. The method of claim 14 wherein the fine-grained material is additionally selectively applied onto the capacitor winding.

16. An aluminum electrolyte capacitor composed of wound layers of two aluminum foils, the foil serving as anode is provided with an oxide layer acting as dielectric, and is produced by cutting from a larger, formed foil web, spacers saturated with an operating electrolyte are arranged between the two aluminum foils and the aluminum foils are contacted with power supply terminal strips, wherein at least terminal elements of the aluminum foil are covered with a fine-grained, electrolyte-compatible material that includes at least one compound chosen from the group consisting of silicic acid, diatomaceous earth, hydrargillite (Al(OH)$_3$), and cellulose fibers, to reduce the effective cross-section of the electrolyte by the fine-grained material to increase the sparking voltage of the operating electrolyte and thus to achieve an inactivation of weak points.

17. The aluminum electrolyte capacitor of claim 16 wherein the cut edges of the aluminum foil located at the face sides of the winding are covered with the fine-grained, electrolyte-compatible material.

18. The aluminum electrolyte capacitor of claim 17 wherein the fine-grained material is a high-purity, highly dispersed and finely dispersed silicic acid having a specific surface of approximately 50 to about 300 m$^2$/g and a mean primary particle size of approximately 10 to about 40 nm.

19. The aluminum electrolyte capacitor of claim 16 wherein the fine-grained material is a high-purity, highly dispersed and finely dispersed silicic acid having a specific surface of approximately 50 to about 300 m$^2$/g and a mean primary particle side of approximately 10 to about 40 nm.

* * * * *